Sept. 10, 1968 R. M. O'LEAR 3,401,343
HIGH SPEED BINARY COUNTER EMPLOYING J-K FLIP-FLOPS
Filed May 23, 1966
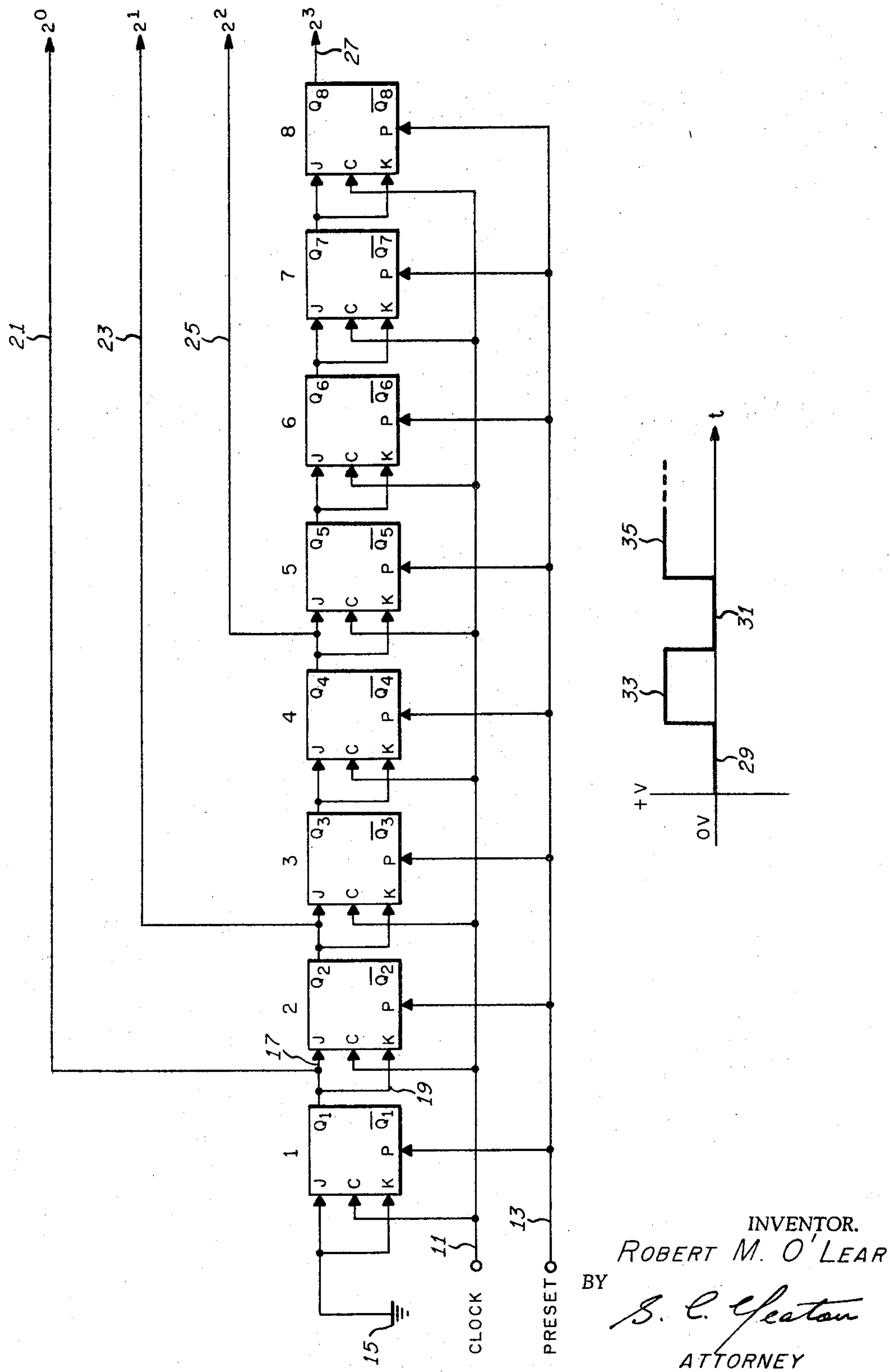
INVENTOR.
ROBERT M. O'LEAR
BY S. C. Yeaton
ATTORNEY

United States Patent Office 3,401,343

Patented Sept. 10, 1968

3,401,343

HIGH SPEED BINARY COUNTER EMPLOYING J-K FLIP-FLOPS

Robert M. O'Lear, Yonkers, N.Y., assignor to Sperry Rand Corporation, a corporation of Delaware

Filed May 23, 1966, Ser. No. 552,289

9 Claims. (Cl. 328—41)

This invention relates to binary counters and more specifically to synchronous binary counters.

Many types of binary counters are known in the prior art. Certain varieties of these counters use circuits known as J-K flip-flops in each counter stage. Although these prior art circuits have proven extremely useful, they do not take full advantage of the high speed switching capabilities of the J-K flip-flops.

J-K flip-flops have been used, for instance, in so-called "synchronous" circuits in which each clock pulse is applied to each counter stage. Carry signals are passed through associated gating circuits. A carry pulse from the first stage must propagate down the length of the counter to the last stage and experience a delay each time it passes through a gating circuit. A second clock pulse cannot be accommodated until the previous pulse has propagated through the entire chain of gating circuits.

It is an object of the present invention to provide a binary counter capable of operating at high counting rates.

It is another object of the present invention to provide a synchronous binary counter that does not require auxiliary gating circuits.

These and other objects of the invention are achieved by providing a series of directly coupled J-K flip-flops and using the voltages from only selected stages as output indications of the desired binary coded number.

The principles and operation of the present invention may be understood by referring to the following description and the accompaning drawing.

J-K flip-flops have been defined by Montgomery Phister, Jr. in "Logical Design of Digital Computers" (John Wiley and Sons, New York, N.Y. 1958) as flip-flops which present a known output from simultaneous logic ONES at the inputs.

The operation of such J-K flip-flops are also defined by Phister in the Truth Table:

| $J^n$ | $K^n$ | $Q^{n+1}$ |
|---|---|---|
| 0 | 0 | $Q^n$ |
| 0 | 1 | 0 |
| 1 | 0 | 1 |
| 1 | 1 | $\overline{Q}^n$ |

Thus, if binary ZERO is applied to both the J and K terminals, a clock pulse will leave the flip-flop in its original state. However, a binary ONE applied to both J and K terminals acts as an enabling voltage that permits a clock pulse to change the state of the flip-flop. If unlike binary signals are applied to the J and K terminals, however, the flip-flop will be left in a binary state depending upon the particular combination of binary values of the unlike signals.

J-K flip-flops have recently been developed in the form of integrated or microcircuits. One example of these circuits is described in the Technical Information and Application Bulletin "Fan-Out," No. 116 for February 1964, published by Fairchild Semiconductor, 545 Whisman Road, Mountain View, Calif.

A particular microcircuit described in this publication is designated $\mu$L 916 and contains J and K input terminals, and a clock input terminal. The circuit also contains a PRESET terminal as well as Q and $\overline{Q}$ output terminals. High level voltages correspond to binary ZERO and low level voltages correspond to binary ONE. A PRESET signal having a value of binary ZERO resets the flip-flop so that the voltage at the Q terminal of that flip-flop becomes binary ZERO.

Referring now to the figure, an eight-stage counter contains a J-K flip-flop as the circuit element for each stage. The stages are arranged in cascade and numbered consecutively for purposes of identification. The conventional J-K designations are used to indicate the input terminals and Q and $\overline{Q}$ designations are used to indicate the output terminals of the flip-flop. Clock pulses to be counted are applied through a clock bus 11 to the C input terminal of each stage. PRESET pulses are applied through a PRESET bus 13 to the P input of each stage. A PRESET pulse is applied to the counter before a counting cycle is to begin. This sets each stage to the binary ZERO state and thus removes all interstage coupling voltages. It will be realized, however, that some applications may not require the use of these PRESET features so that J-K flip-flops not having PRESET input terminals can be used in circuits employing the invention. Still other applications may arise in which it is desired to preset the various stages individually.

The J-K input terminals of input stage 1 are grounded at a ground point 15. The $Q_1$ output terminal of stage 1 is connected directly to both the J and K input terminals of stage 2 through the lines 17 and 19, respectively. The $\overline{Q}_1$ output terminal is left unconnected. Similarly, each of the terminals of stages 2 through 7 are connected directly to the J and K input terminals of the succeeding stage. The $\overline{Q}$ terminals of each of these stages are left unconnected.

Output lines 21, 23, 25 and 27 are connected to the Q terminals of the stages 1, 2, 4, and 8, respectively. The output lines terminate in output connectors designated in the corresponding exponential notation for convenience.

Although an eight-stage counter has been designated for purposes of illustration, it will be appreciated that counters having any convenient number of stages may be used as desired. In general, if the stages are numbered arranged in cascade and numbered consecutively for identification, outputs will be taken only from those stages whose identifying numbers form a binary sequence.

The operation of the circuit shown in the figure can be understood by again assuming for purpose of explanation that each J-K flip-flop is a Fairchild $\mu$L 916 integrated circuit.

These particular devices use "negative logic," that is, a high level voltage represents a binary ZERO whereas a low level voltage represents a binary ONE as indicated in the graph included in the figure. Thus, voltages occurring during the times 29 and 31 are considered as binary ONE voltages whereas the voltages occurring during times 33 and 35 are considered as binary ZERO voltages.

The flip-flops are arranged to switch in response to the negative-going edge of the clock pulses.

The counting cycle can be visualized by means of the Truth Table:

| Count | Stages | | | | | | | |
|---|---|---|---|---|---|---|---|---|
| | 8 | 7 | 6 | 5 | 4 | 3 | 2 | 1 |
| 0 | 0 | 0 | 0 | 0 | 0 | 0 | 0 | 0 |
| 1 | 0 | 0 | 0 | 0 | 0 | 0 | 0 | 1 |
| 2 | 0 | 0 | 0 | 0 | 0 | 0 | 1 | 0 |
| 3 | 0 | 0 | 0 | 0 | 0 | 1 | 1 | 1 |
| 4 | 0 | 0 | 0 | 0 | 1 | 0 | 0 | 0 |
| 5 | 0 | 0 | 0 | 1 | 1 | 0 | 0 | 1 |
| 6 | 0 | 0 | 1 | 0 | 1 | 0 | 1 | 0 |
| 7 | 0 | 1 | 1 | 1 | 1 | 1 | 1 | 1 |
| 8 | 1 | 0 | 0 | 0 | 0 | 0 | 0 | 0 |
| 9 | 1 | 0 | 0 | 0 | 0 | 0 | 0 | 1 |
| 10 | 1 | 0 | 0 | 0 | 0 | 0 | 1 | 0 |
| 11 | 1 | 0 | 0 | 0 | 0 | 1 | 1 | 1 |
| 12 | 1 | 0 | 0 | 0 | 1 | 0 | 0 | 0 |
| 13 | 1 | 0 | 0 | 1 | 1 | 0 | 0 | 1 |
| 14 | 1 | 0 | 1 | 0 | 1 | 0 | 1 | 0 |
| 15 | 1 | 1 | 1 | 1 | 1 | 1 | 1 | 1 |
| 16 | 0 | 0 | 0 | 0 | 0 | 0 | 0 | 0 |

The first clock pulse switches stage 1 to the binary ONE state so that it then provides a binary ONE voltage at the $Q_1$ terminal. This effectively constitutes an enabling voltage for stage 2. Since none of the other stages are receiving binary ONE voltages from the previous stages during the occurrence of this first clock pulse, none of these latter stages will be switched by the initial pulse. After this initial pulse, stage 1 produces a binary ONE voltage at its Q terminal. This appears at the J and K terminals of stage 2 and at the output terminal $2^0$.

The second clock pulse switches both stage 1 and stage 2 so that stage 2 thereafter produces a binary ONE voltage at its Q terminal. After the second clock pulse, stage 1 is in the binary ZERO state. This leaves an output signal only at the output terminal $2^1$.

The circuit conditions resulting from succeeding pulses can best be visualized by referring to the Truth Table.

From the Truth Table, it can be seen that the voltages appearing at the Q terminals of stages 1, 2, 4, and 8 occur in a sequence that forms a binary coded indication of the number of clock pulses or "counts." By using the voltages appearing at the Q terminals from these stages only, the counter thus produces an output having the desired binary characteristics.

Since the flip-flop stages are directly coupled, the only delays encountered are those inherent in the flip-flop themselves. The delays ordinarily encountered in auxiliary gating circuits are thus eliminated.

In a practical circuit employing J-K flip-flops of the type described, counting rates as high as 10.5 megacycles per second have been counted.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An n-stage binary counter for counting clock pulses comprising a J-K flip-flop for each stage in the counter, said stages being arranged serially and considered numbered consecutively for identification; means to apply a steady enabling voltage to the flip-flop in the first stage; means between each pair of adjacent stages to enable the higher-valued stage of said pair only when the lower-valued stage of the same pair is in a given binary state; means to apply each clock pulse to each stage; means to extract a first output signal when the first stage is in said given binary state; and means to extract additional output signals from those stages only whose identifying numbers form a binary sequence.

2. The apparatus of claim 1 wherein the J-K flip-flops contain J and K enabling signal input terminals, a clock input terminal, and a Q output terminal arranged to be energized when the flip-flop is in the binary ONE state; and wherein said given state is the binary ONE state.

3. The apparatus of claim 2 wherein the means to apply the steady enabling voltage to the first flip-flop includes means to connect the J and K input terminals of the first flip-flop to a source of steady voltage at the binary ONE level; and wherein the means between each pair of adjacent stages includes means connecting the J and K terminals of the higher-valued stage of the pair to the Q output terminal of the lower-valued stage of the pair.

4. The apparatus of claim 3 further characterized in that the means to extract a first output signal includes electrical conducting means connected to the Q terminal of the flip-flop in the first stage and in that the means to extract additional output signals includes individual electrical conducting means connected to the Q output terminals on those stages whose identifying numbers form a binary sequence.

5. The apparatus of claim 1 wherein the counter is an eight-stage counter and wherein said additional output signals are taken from the second, fourth and eighth stages respectively.

6. Apparatus for counting clock pulses comprising a plurality of eight counter stages connected in cascade; a J-K flip-flop in each counter stage; means to apply a steady enabling voltage to the flip-flop in the first stage; intercoupling means between each pair of adjacent stages, each of said intercoupling means being connected to provide an enabling voltage to one of the stages in the associated pair when and only when the other of the stages in the same pair is in a given binary state; means connected to the first, second, fourth and eighth stages of said counter to provide individual output voltages indicative of the binary state of the stages; and means to couple the clock pulses to be counted to each stage simultaneously.

7. The apparatus of claim 6 in which the J-K flip-flops contain J and K input terminals to receive enabling voltages, a clock input terminal, and a Q output terminal that becomes energized whenever the flip-flop is in the binary ONE state; and wherein the given binary state is the binary ONE state.

8. The apparatus of claim 7 further characterized in that each intercoupling means is connected between the Q terminal of one of the stages in each pair and both the J and K terminals of the other stage in the same pair.

9. The apparatus of claim 8 further characterized in that the means connected to the first, second, fourth and eighth stages of the counter are connected to the Q output terminals of the flip-flops in the respective stages.

References Cited

UNITED STATES PATENTS

| | | | |
|---|---|---|---|
| 3,348,156 | 10/1967 | Toscano | 328—42 |
| 3,351,778 | 11/1967 | Seelbach et al. | 328—45 XR |

ARTHUR GAUSS, *Primary Examiner.*

J. ZAZWORSKY, *Assistant Examiner.*